A. S. BULLOCK.
TIRE SHOE.
APPLICATION FILED APR. 13, 1912.
1,076,345.
Patented Oct. 21, 1913.
2 SHEETS—SHEET 1.
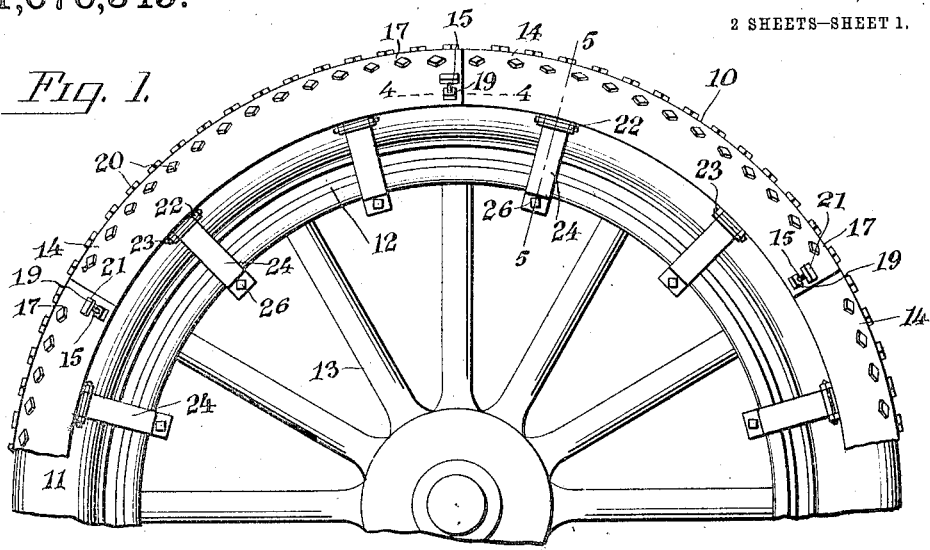
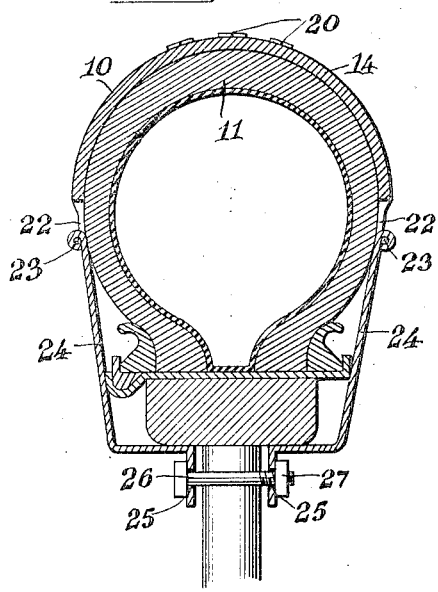
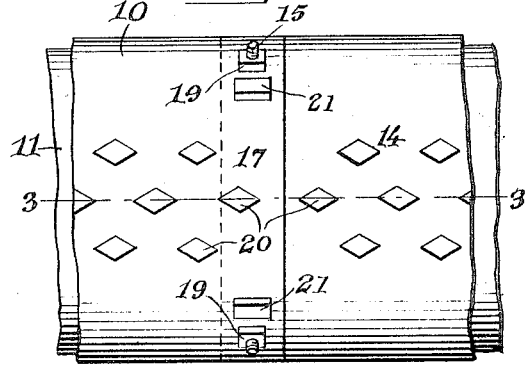
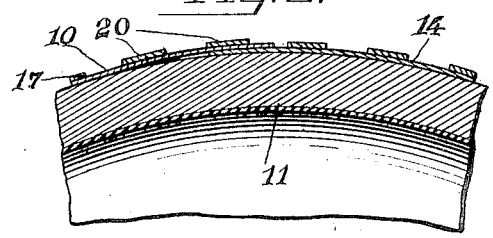
Inventor
Arthur S. Bullock
Witnesses
By Victor J. Evans
Attorney

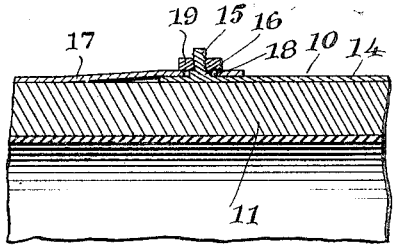
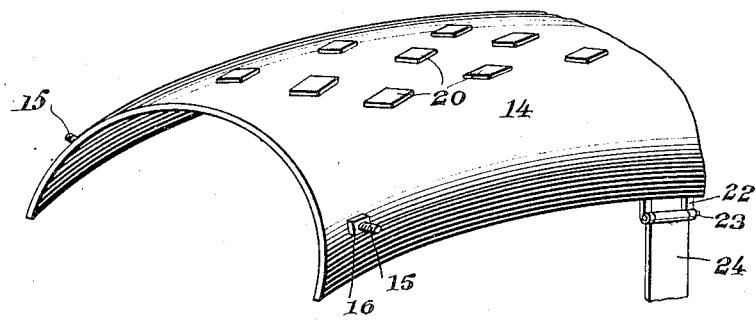
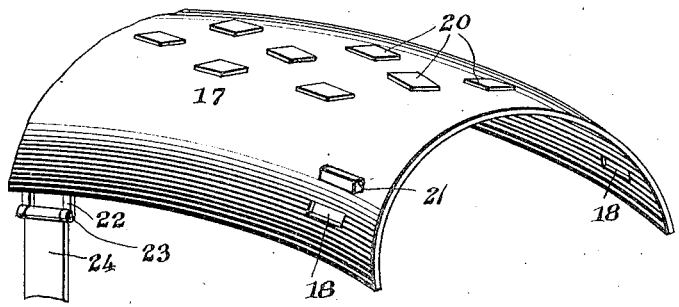

UNITED STATES PATENT OFFICE.

ARTHUR S. BULLOCK, OF AITKIN, MINNESOTA.

TIRE-SHOE.

1,076,345.

Specification of Letters Patent.

Patented Oct. 21, 1913.

Application filed April 13, 1912. Serial No. 690,529.

*To all whom it may concern:*

Be it known that I, ARTHUR S. BULLOCK, a citizen of the United States, residing at Aitkin, in the county of Aitkin and State of Minnesota, have invented new and useful Improvements in Tire-Shoes, of which the following is a specification.

An object of the invention is to provide a shoe for attachment to a wheel provided with a tire, the shoe being arranged to partially cover the periphery of the tire and protect the surface thereof.

The invention embodies, among other features, a tire shoe comprising a series of connectible sections arranged with their ends in overlapping and adjustable relation, the sections being connected to a vehicle wheel provided with a tire so that the sections will partially cover the periphery of the tire and protect the surface of the tire from wear and tear, the sections being independently removable from the vehicle wheel for the purpose of substituting new sections for those sections which are worn and unfit for use.

In the further disclosure of the invention reference is to be had to the accompanying drawings constituting a part of this specification in which similar characters of reference denote corresponding parts in all the views, and in which:

Figure 1 is a side elevation of a portion of a vehicle wheel provided with a tire, my device being shown mounted thereon; Fig. 2 is an enlarged fragmentary plan view; Fig. 3 is a vertical sectional view taken on the line 3—3 in Fig. 2; Fig. 4 is a vertical sectional view taken on the line 4—4 in Fig. 1; Fig. 5 is an enlarged fragmentary transverse sectional view taken on the line 5—5 in Fig. 1; Fig. 6 is a fragmentary perspective view of one end of one of the sections; and Fig. 7 is a fragmentary perspective view of the other end of another section.

Referring more particularly to the views, use is made of a series of adjustably connected sections 10 mounted to encircle a tire 11, arranged on a rim 12 of a vehicle wheel 13. The sections 10 are each semi-circular in cross section and an end 14 of one of the sections has pins 15 extending outwardly from the surface thereof, the said pins being arranged on both sides of the center of the section and having formed therewith guide members 16 formed with the said section, the said guide members constituting bases for the pins 15. An end 17 of an adjacent section 10 is provided with longitudinally extending slots 18, the said slots being arranged on both sides of the longitudinal axis of the section with the mentioned end 17 of the adjacent section adapted to overlap the end 14 of the first mentioned section so that the pins 15 will extend through the slots 18 with the guide members 16 arranged within the slots 18, suitable nuts 19 being then mounted on the free ends of the pins 15, which are preferably threaded to receive the nuts to retain the second mentioned section 10 in overlapping position on the first mentioned section, it being readily understood that the slots 18 are longer than the guide members 16 in order that the guide members 16 of the first mentioned section can slide relatively to the second section, thus permitting a convenient adjustment of the adjacent connected sections and preventing any binding thereof.

The sections 10 are preferably made of a thin sheet-like metal and by providing the pins 15 on the sides of the sections adjacent the longitudinal edges thereof, the free ends of the mentioned pins will be prevented from contacting with the ground in view of the concave formation of the sections and the tire 11. A series of diamond shaped tread members 20 are preferably arranged or formed on the surfaces of the sections 10 and on those portions of the sections that come in contact with the ground, the said tread members being adapted to prevent slipping or skidding in wet and slippery weather. In order to amply protect the pins 15, guard plates 21 are mounted on the surfaces of the sections 10 adjacent the slots 18 thereof, the said guard plates extending outwardly from the surfaces of the sections a sufficient distance to substantially protect the protruding ends of the pins 15 from contact with large stones on the road.

Formed on the side edges of the sections 10 are ears 22, through which are passed pins 23 and mounted to swing on the said pins are oppositely arranged connecting members 24, the said connecting members being substantially S-shaped in cross section and provided with transversely extending apertures 25, the mentioned connecting members being adapted to extend around the rim 12 so that the apertures 25 of oppositely arranged connecting members will register to receive therethrough suitable bolts 26, provided with nuts 27 threaded on the bolts to retain the outer ends of the oppositely arranged connecting members in rigid connected position, thus firmly securing the sections 10 to the tire 11.

The various parts of my tire shoe are preferably formed of metal and as mentioned heretofore, the sections 10 are formed of a tough, sheet-like metal, the adjacent sections being adjustably connected so as to prevent any binding of the sections, it being readily understood that the connected sections are, to a certain extent, self-adjusting in view of the fact that the adjacent sections are not rigidly connected but are slidingly connected, thus permitting one section to operate or slide on another.

It will be readily understood that the sections can be made in various shapes and sizes to conform to tires of various shapes and sizes and, although for the purpose of describing the invention I have shown a particular form of the device, it will be understood that I do not limit myself thereto and that the scope of the invention is defined in the appended claim.

Having thus described my invention, I claim:

In a tire shoe, the combination with a plurality of connectible sections adapted to encircle the tire, of rectangular guide members formed on the outer faces of the said sections adjacent the ends thereof and adapted to slidably extend through elongated slots in the opposed ends of adjacent sections, pins projecting from the faces of the guide members and also passing through the said slots, and nuts carried on the free ends of the pins to retain the connectible sections in slidable engagement.

In testimony whereof I affix my signature in presence of two witnesses.

ARTHUR S. BULLOCK.

Witnesses:
 THOS. R. FOLEY, Jr.,
 KATE E. FRANZ.